UNITED STATES PATENT OFFICE.

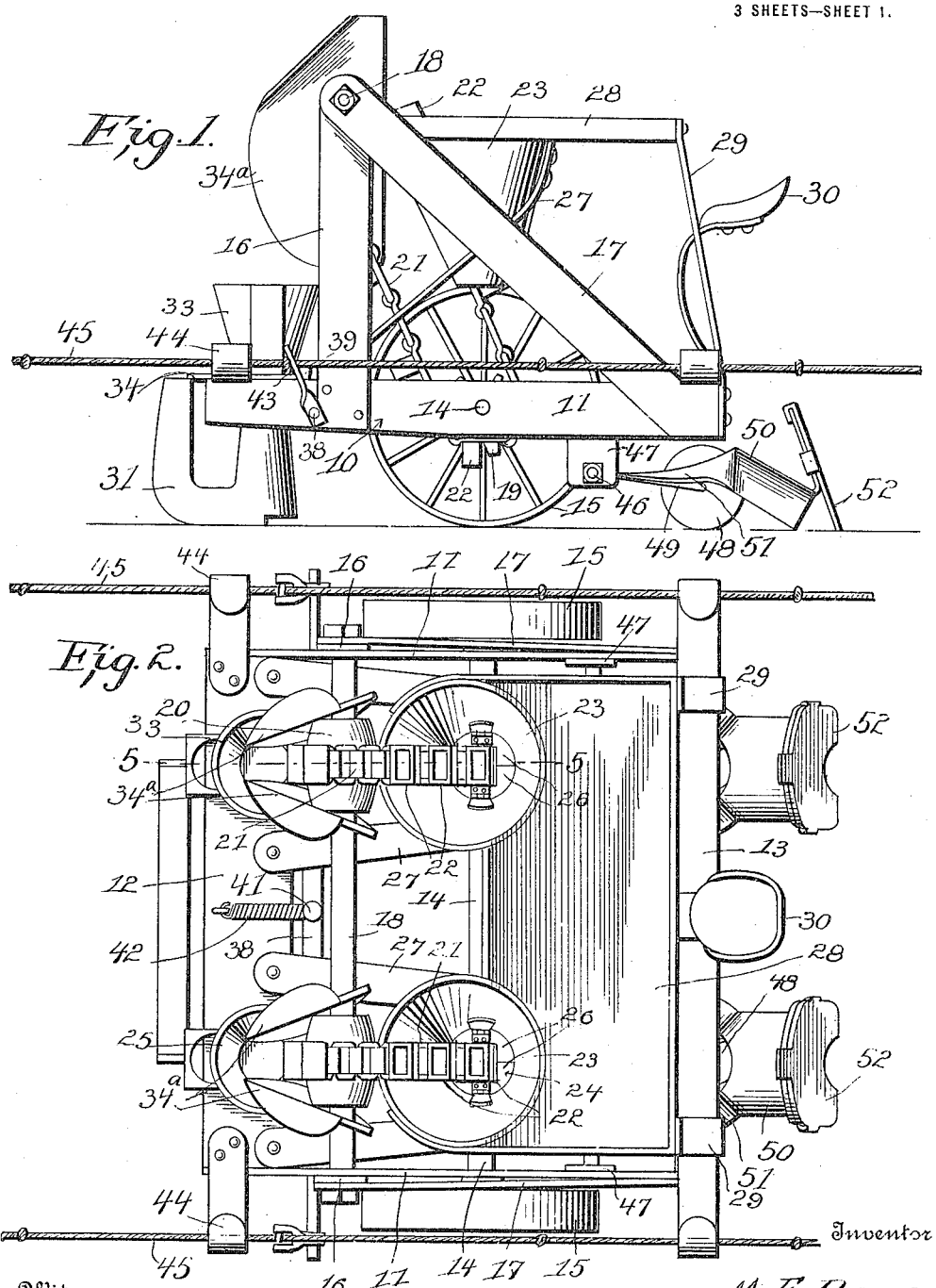

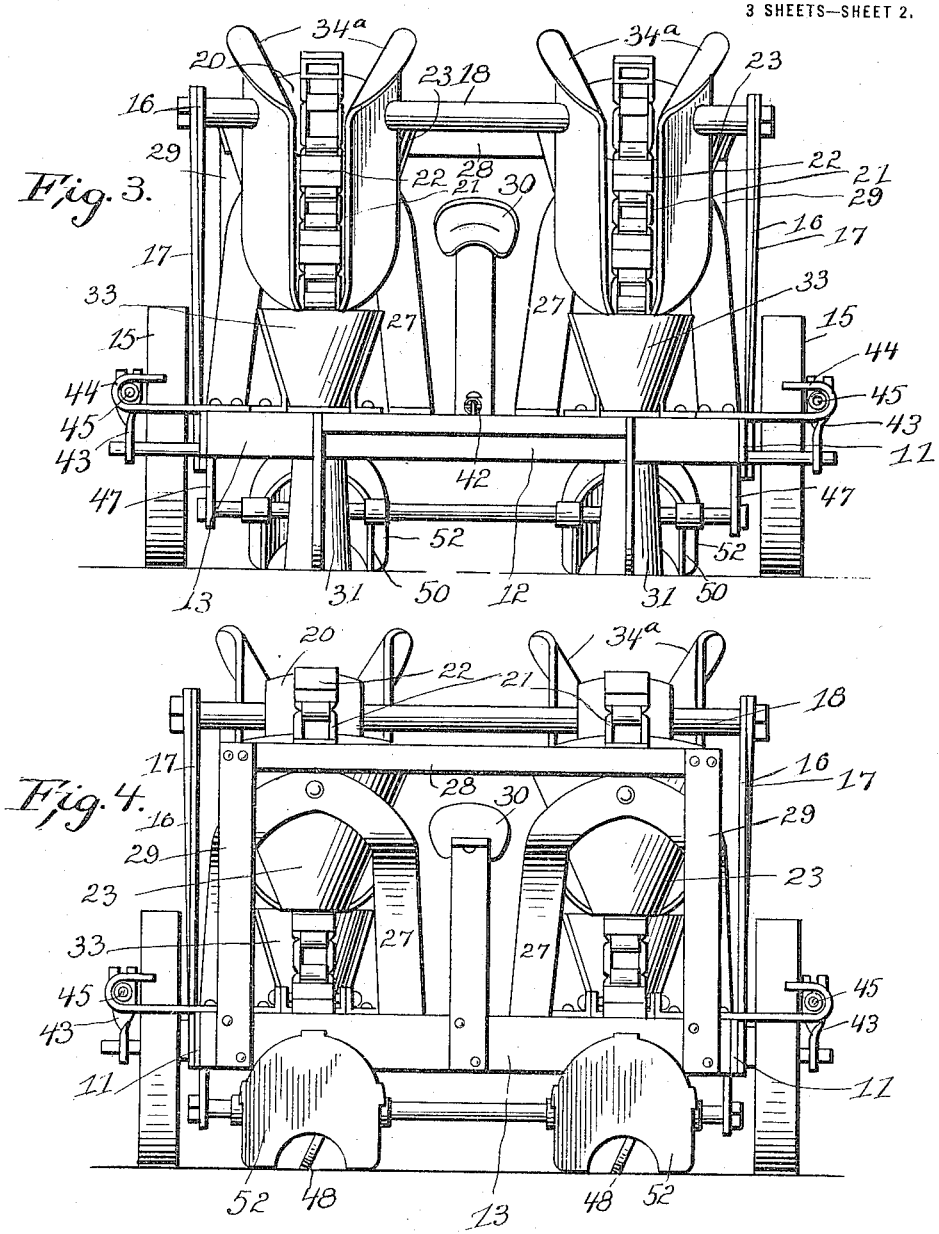

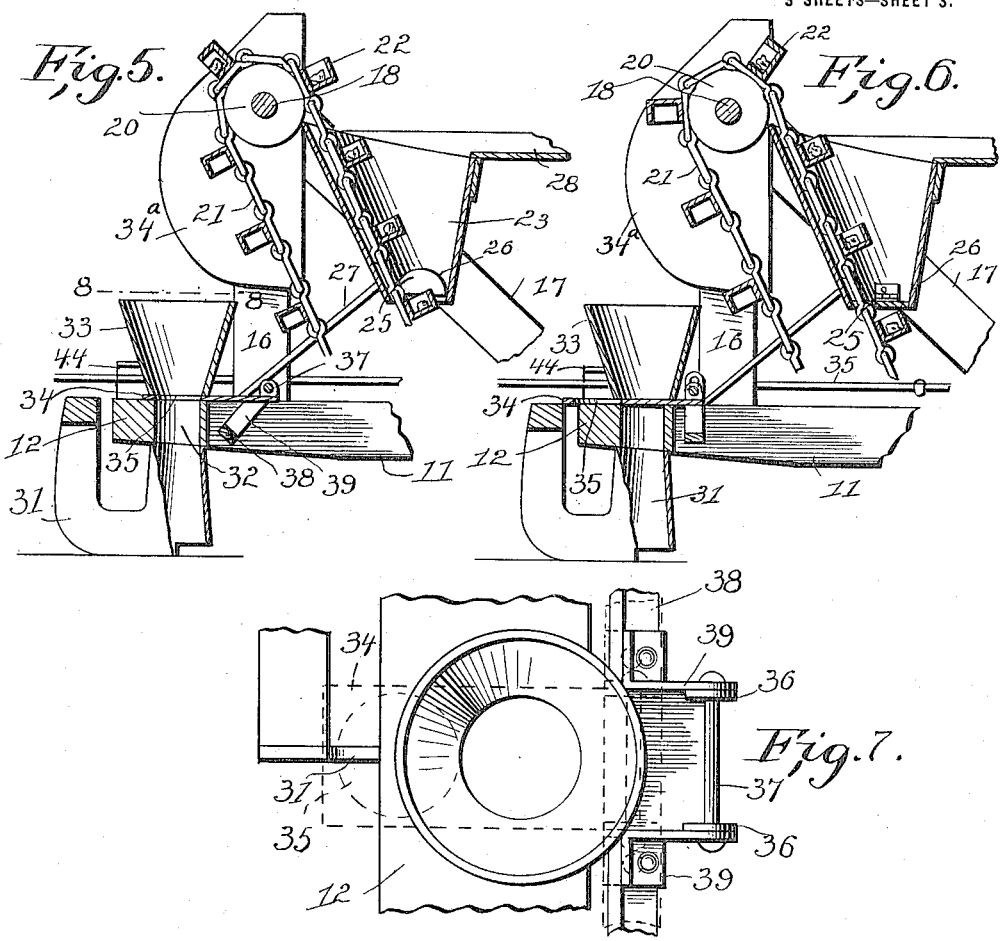

MARY E. DORE, OF BECKER, MINNESOTA.

POTATO-PLANTER.

1,158,031. Specification of Letters Patent. Patented Oct. 26, 1915.

Application filed November 14, 1912. Serial No. 731,373.

*To all whom it may concern:*

Be it known that I, MARY E. DORE, a citizen of the United States, residing at Becker, in the county of Sherburne, State of Minnesota, have invented certain new and useful Improvements in Potato-Planters; and I do hereby declare the following to be a full, clear, and exact description of the invention, such as will enable others skilled in the art to which it appertains to make and use the same.

This invention relates to planters and has for an object to provide a check row potato planter that will drop single seeds at predetermined intervals in parallel rows.

A further object of the invention is to provide a novel feed mechanism that will remove the seed potatoes one at a time from the seed hopper and drop the same into the planter boot.

A still further object of the invention is to provide an extremely simple and inexpensive planter that will plant potatoes and cover the same.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of the planter rear wheel removed. Fig. 2 is a plan view of the planter. Fig. 3 is a front elevation of the planter. Fig. 4 is a rear elevation of the planter. Fig. 5 is a longitudinal sectional view taken on the line 5—5 Fig. 2 showing the planter valve open and the endless feeder belt in position to discharge a seed through the open valve. Fig. 6 is a view similar to Fig. 5 but showing the planter valve closed. Fig. 7 is a cross sectional view taken on the line 8—8 Fig. 5 showing the planter valve in plan in open position and in dotted lines in closed position.

Referring now to the drawings in which like characters of reference designate similar parts, the planter is shown to comprise a substantially rectangular main frame including opposite side members 11 and opposite front and rear members 12 and 13. An axle 14 is journaled in the side members and is equipped terminally with ground wheels 15. A pair of parallel standards 16 rises from the side members 11 near the frame front member 12, these standards being braced by inclined rearwardly extending braces 17. A transverse shaft 18 is journaled in the upper ends of the standards and extends parallel with the rotary axle 14.

Fixed to the axle 14 are spaced sprocket gears 19 and disposed on the transverse shaft 18 in alinement with these gears are spaced pulleys 20. A sprocket chain 21 is trained over each gear and the corresponding pulley and each sprocket chain is equipped with cups 22 which are spaced at equal distances apart.

Surrounding the rear lap of each sprocket chain is a seed potato hopper 23 which is inverted frusto-conical in outline, the cups on the related chain when moving up through the hopper each receiving a seed potato and carrying the same forwardly over the related pulley 20, and finally discharging the potato through an open valve of the planter boot as will presently be described. For preventing the seed potatoes from escaping through the bottom of the potato hopper during passage of the chain between cups through the hopper, a bottom 24 is arranged in the hopper, the bottom being formed of hinged flaps 26, these flaps being swung up by passage of the cups in succession, and closing immediately after the passage of the cups. There is an opening 25 in the bottom flaps for the chain, to permit free passage thereof when the bottom is closed.

The seed potato hoppers 23 are supported in position by bracket arms 27 secured to the front member 12 of the frame, and furthermore a feed table 28 is supported in rear of the upper ends of the hoppers by means of bracket arms 29 secured to the rear member 13 of the frame. Seed potatoes may be fed at will from this feed board into the hoppers to replenish the supply of the seed potatoes in the hoppers. A seat 30 is secured to the rear member of the frame as shown.

Secured to the under face of the front member 12 of the frame are spaced planter boots 31 the upper open ends of which register with openings 32 formed in said front member. Secured to the top face of the front member are spaced inverted frusto-conical hoppers 33 which receive the seed potatoes discharged from the cups of the related chains. A pair of fixed guide plates 34ª are disposed on the transverse shaft 18 on opposite sides of each pulley and serve to direct the seed potatoes from the cups into their respective hoppers. The openings 32 are normally closed by valves which are preferably regulated by a check wire to open at the instant a cup discharges its potato into the underlying hopper 33 and permit of the potato dropping through the boot into the furrow made by the latter.

Each valve comprises an oblong blank of sheet metal 34 which is slidably fitted on the top face of the front member 12 of the frame underneath the related hopper 33, and is imperforate near one end to form a closure for the bottom of the hopper and registering opening 32, there being a circular opening 35 stamped out of the blank which when the blank is slid rearwardly exposes the opening 32 and permits of the seed potatoes gravitating therethrough into the boot. A pair of lugs 36 are struck up from the rear corners of the valve and receive the ends of a pintle 37.

A rock shaft 38 is journaled in the side members and is equipped with pairs of crank arms 39 which are connected to the respective terminals of the valve pintle 37. A crank arm 41 carried by the rock shaft between the valves is connected to a helical spring 42 carried by the front member 12 of the frame which spring normally holds the rock shaft in position to hold the valves closed. For rotating the rock shaft and opening the valves the outer ends of the rock shaft are equipped with notched crank arms 43 which are normally held toward curved guides 44 through which the knotted check wires 45 are trained, the knots in the check wires serving to pull rearwardly the crank arms as the machine travels along between the wires, with a resultant rocking rearwardly of the crank shaft against the tension of its controlling spring and resultant simultaneous opening of the valves.

What is claimed, is:—

In a planter, a frame, spaced planter boots mounted on the frame, inverted frusto-conical hoppers mounted above and adjacent to said boots and provided with open bottoms, a squared rock-shaft journaled in and extending outwardly beyond the frame, pairs of crank arms upwardly attached to the upper squared face of the rockshaft adjacent to the base of said respective hoppers and the members of each pair spaced apart a distance greater than the opening in the bottom of said hopper, a valve comprising an oblong blank of sheet metal slidably mounted on the top face of the frame underneath the respective hoppers, said blank being imperforate at one end and provided with a circular opening in the oppostie end, a pair of pintles hingedly attached to the rear of said respective valves and at the opposite sides thereof, the opposite ends of said pintles being attached to the outer extremities of said crank arms, means for communicating a rocking motion to said rock-shaft to bring the open end of said valve alternately with the closed end thereof in registry with the open bottom of said hopper, and means for supplying seeds intermittently to said respective hoppers.

In testimony whereof, I affix my signature, in the presence of two witnesses.

MARY E. DORE.

Witnesses:
E. R. WALTER,
W. E. CRUZEN.

Copies of this patent may be obtained for five cents each, by addressing the "Commissioner of Patents, Washington, D. C."